(12) United States Patent
Waltermann et al.

(10) Patent No.: US 8,190,823 B2
(45) Date of Patent: May 29, 2012

(54) APPARATUS, SYSTEM AND METHOD FOR STORAGE CACHE DEDUPLICATION

(75) Inventors: Rod D. Waltermann, Rougemont, NC (US); Mark Charles Davis, Durham, NC (US)

(73) Assignee: Lenovo (Singapore) Pte. Ltd., Tech Park (SG)

( * ) Notice: Subject to any disclaimer, the term of this patent is extended or adjusted under 35 U.S.C. 154(b) by 810 days.

(21) Appl. No.: 12/233,264

(22) Filed: Sep. 18, 2008

(65) Prior Publication Data

US 2010/0070715 A1   Mar. 18, 2010

(51) Int. Cl.
*G06F 12/00* (2006.01)
(52) U.S. Cl. ........ 711/129; 711/113; 711/118; 711/130; 711/133; 711/170; 711/173; 711/E12.001; 711/E12.009; 711/E12.046; 711/E12.022; 711/E12.023
(58) Field of Classification Search .................. 711/113, 711/118, 129, 130, 170, 173, E12.001, E12.009, 711/E12.046, 133, E12.022, E12.023
See application file for complete search history.

(56) References Cited

U.S. PATENT DOCUMENTS

| | | | |
|---|---|---|---|
| 7,769,952 B2 * | 8/2010 | Hashimoto et al. | 711/129 |
| 2006/0116989 A1 * | 6/2006 | Bellamkonda et al. | 707/3 |
| 2008/0049354 A1 * | 2/2008 | Nitta | 360/72.1 |

* cited by examiner

*Primary Examiner* — Midys Rojas
(74) *Attorney, Agent, or Firm* — Kunzler Needham Massey & Thorpe (57) ABSTRACT

An apparatus, system, and method are disclosed for deduplicating storage cache data. A storage cache partition table has at least one entry associating a specified storage address range with one or more specified storage partitions. A deduplication module creates an entry in the storage cache partition table wherein the specified storage partitions contain identical data to one another within the specified storage address range thus requiring only one copy of the identical data to be cached in a storage cache. A read module accepts a storage address within a storage partition of a storage subsystem, to locate an entry wherein the specified storage address range contains the storage address, and to determine whether the storage partition is among the one or more specified storage partitions if such an entry is found.

24 Claims, 10 Drawing Sheets

APPARATUS, SYSTEM AND METHOD FOR STORAGE CACHE DEDUPLICATION

BACKGROUND OF THE INVENTION

1. Field of the Invention

This invention relates to computer cache technology and more particularly relates to computer storage data caching.

2. Description of the Related Art

It has long been recognized that computer programs exhibit both temporal and spatial locality of reference. This statistical fact underpins computer cache technology, in which recently and proximally accessed information from a larger, higher latency medium is cached in a smaller, lower latency medium. The effective latency of the combined media becomes the cache hit rate times the lower latency plus the cache miss rate times the higher latency. The concept has been extended to multiple levels of caching within the memory hierarchy, including storage (e.g. disk), main memory, global cache, local cache, and registers.

Storage data caching generally refers to the caching of data from the storage subsystem in a memory-based cache. The memory-based cache may be implemented within the storage subsystem or it may reside in the main memory of the computer(s) served by the storage subsystem, or both.

As noted above, the performance of a cache is largely a function of the miss rate (the hit rate is simply one minus the miss rate). However, the cache miss rate is rarely constant. It tends to spike to a high level when a new working set is introduced, such as by a context switch, and then gradually declines to a steady-state level. If the media involved have relatively low latency (e.g. main memory), such variations are not typically noticeable by a user. However, a spike in the miss rate for storage data caching, with the high latency involved in the mechanical rotation of the disk, can indeed cause a very noticeable delay, impacting the productivity of the user(s).

The delay is particularly problematic at initial boot-up, when a great deal of data is being accessed for the first time and the cache miss rate is thus very high. The problem becomes even more impactful when an entire data processing system is brought on-line with many computers sharing a single storage subsystem, such as a SAN (Storage Area Network).

SUMMARY OF THE INVENTION

From the foregoing discussion, it should be apparent that a need exists for an apparatus, system, and method that reduces the initial storage access overhead when the storage data caching miss rate is high. Beneficially, such an apparatus, system, and method would reduce the effective miss rate.

The present invention has been developed in response to the present state of the art, and in particular, in response to the problems and needs in the art that have not yet been fully solved by currently available storage data caching. Accordingly, the present invention has been developed to provide an apparatus, system, and method for storage data caching that overcome many or all of the above-discussed shortcomings in the art.

A data processing system having a large number of similarly-configured computers, such as a call center, tends to experience a large boot-up delay as all of the client computers go after the same initial storage data at substantially the same time. Each computer typically has a dedicated storage partition, such as a LUN, within the storage subsystem. The storage partitions were all likely created from the same master disk image, and thus much of the data is laid out identically across storage partitions. The present invention reduces the cumulative storage cache miss rate of the data processing system by deduplicating the contents of the storage cache. Rather than each computer diluting the cache with an identical copy of the common data, only one copy is cached. After one computer has cached a deduplicated copy of a common item of data, all of the other computers may access it from the cache without incurring a miss, thus reducing the effective overall miss rate.

The apparatus to reduce the storage data caching miss rate is provided with a plurality of modules configured to functionally execute the necessary steps of deduplication, reading, and writing. These modules in the described embodiments include a deduplication module, a read module, a write module, a defragmentation module, and a pre-caching module.

The apparatus, in one embodiment, is configured to deduplicate storage cache data. A deduplication module is configured to create an entry in a storage cache partition table, associating a specified storage address range with one or more specified storage partitions. The specified storage partitions contain identical data to one another within the specified storage address range thus requiring only one copy of the identical data to be cached. In a further embodiment, the determination that the data is identical may be made using a hash function. A read module is configured to access the storage cache partition table entries and determine whether the specified storage address range contains the read storage address and whether the read partition is among the specified storage partitions.

The apparatus is further configured, in one embodiment, to maximize the specified storage address range so as to create as few entries as possible. This approach allows the storage cache partition table to be more compact.

In a further embodiment, the apparatus may include a write module configured to access the storage cache partition table entries and determine whether the specified storage address range contains the write storage address and whether the write partition is among the specified storage partitions. If so, the write partition must be deleted from among the specified storage partitions, since the write partition no longer contains identical data to the other specified storage partitions within the specified storage address range.

In another embodiment, the specified storage address range may be limited in size so as to lessen any potential impact of a write operation. This is at odds with the earlier embodiment which sought to maximize the specified storage address range, and thus represents a trade-off between the storage cache partition table size and the impact of writes.

A system of the present invention is also presented to deduplicate storage cache data. The system may be embodied as a storage cache partition table, a deduplication module, a read module, a write module, a storage subsystem comprising storage partitions, and one or more computers upon which to run the foregoing modules. In particular, the system, in one embodiment, includes a storage cache.

The system may further include a distributed storage cache, comprised of a dedicated storage cache per computer, providing faster access to data cached therein than would be provided by the unified storage cache. Of course, the storage cache and the distributed storage cache do not represent mutually exclusive embodiments. The selection of either or both types of caching structures is another design trade-off that can be made.

In a further embodiment, the computers may be similarly configured, such as blades, diskless workstations, call center workstations, thin clients, and POS terminals. This increases the likelihood of having identical data across the storage partitions, which may then be deduplicated in the storage cache. In such a case it is probable though not necessarily required that there be a one-to-one correspondence between the computers and the storage partitions.

A method of the present invention is also presented for deduplicating storage cache data. The method in the disclosed embodiments substantially includes the steps necessary to carry out the functions presented above with respect to the operation of the described apparatus and system. In one embodiment, the method includes creating an entry in the storage cache partition table, reading data from a read partition or the storage cache based in part upon the contents of the storage cache partition table, writing data to a write partition, and maintaining the storage cache partition table to account for the effect of writes to any hitherto identical data by deleting the write partition from among the specified storage partitions.

The method also may include creating additional entries in the storage cache partition table to minimize the impact of writes. The affected entry may be replaced by creating an entry specifying a minimum-sized address range containing the write storage address and not specifying the write partition, and by creating one or more entries specifying the write partition and respectively specifying address ranges covering the remaining specified storage address range of the affected entry not covered by the minimum-sized address range.

In another embodiment, the method includes a step of defragmenting the storage partitions by relocating data referenced by a minimum-sized address range containing the write storage address to a private area and then relocating the identical data that remains to occupy a common area which is as contiguous as possible. In a further embodiment, the step of defragmenting may be invoked when a threshold of a maximum number of entries in the storage partition cache table is exceeded.

The miss rate may be further reduced by pre-caching a copy of the identical data into the storage cache after creating each entry in the storage cache partition table. As long as the data is pre-cached far enough ahead of when it is needed by the computer, the initial cache miss will be completely eliminated.

In an embodiment, the method may further comprise a step of initiating a boot operation on one or more computers having access to the storage subsystem, wherein the boot operation is accelerated by deduplicating the storage cache data in the manner already described.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 1:
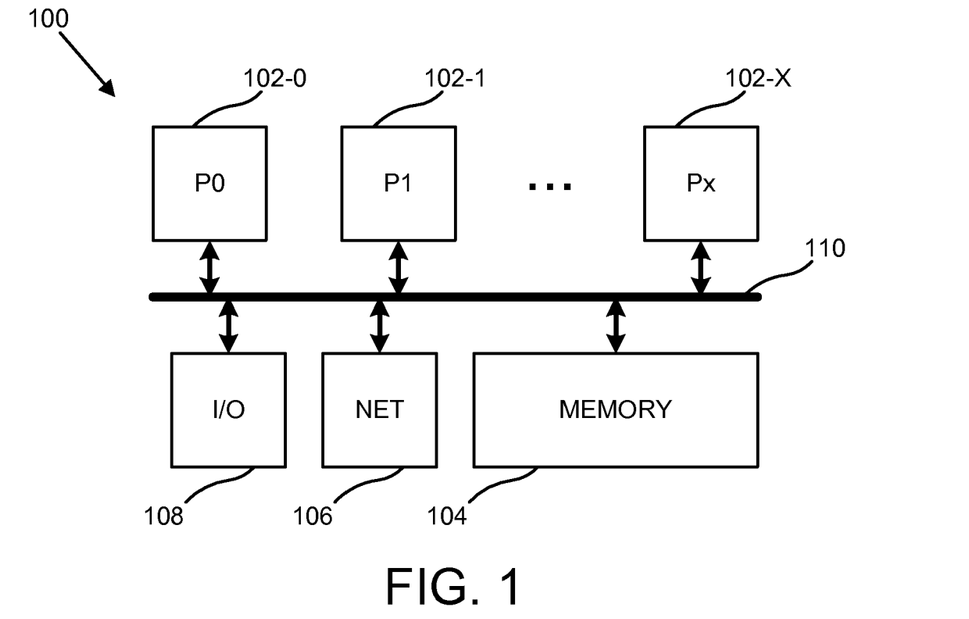
FIG. 1 is a schematic block diagram illustrating a possible computer hardware platform upon which the present invention may be at least in part deployed.

FIG. 1 illustrates a possible computer hardware platform 100 upon which the present invention may be at least in part deployed. The hardware platform 100 may include processor(s) 102, memory 104, a network interface 106, and an input/output device interface 108, connected through a bus 110.

The hardware platform 100 may be of any form factor or type, including an embedded system, a handheld, a notebook, a personal computer, a minicomputer, a server, a mainframe, and a supercomputer.

The processor(s) 102 may be present in any quantity, including a uniprocessor, and may have any instruction set architecture. In an embodiment, the processor(s) 102 may have one or more levels of dedicated or shared caches. Possible physical implementations may include multi-chip, single chip, multi-core, and hyperthreaded processors.

The memory 104 may be of any size or organization and may include both read/write and read-only sections. It may also include both global and local sections, and may support both uniform and non-uniform access. It may incorporate memory-mapped I/O and direct memory access. It may support cache coherency, including directory-based and snoop-based protocols.

The network interface 106 may support any network protocol or architecture. It may support both wireless and hard-wired network connections. In one embodiment, it may be integrated with the input/output device interface 108.

The input/output device interface 108 may be driven primarily by the processor(s) 102 or may incorporate an independent I/O processor subsystem. In an embodiment, it may include dedicated local I/O devices.

The bus 110 may comprise one or more of a variety of physical and logical topologies. It may be parallel or serial. It may be unidirectional or bidirectional. It may be flat or hierarchical. It may comprise a full or partial crossbar. It may comprise multiple bridged busses. In an embodiment, the bus 110 may comprise a high-speed internal network.

Figure 2:
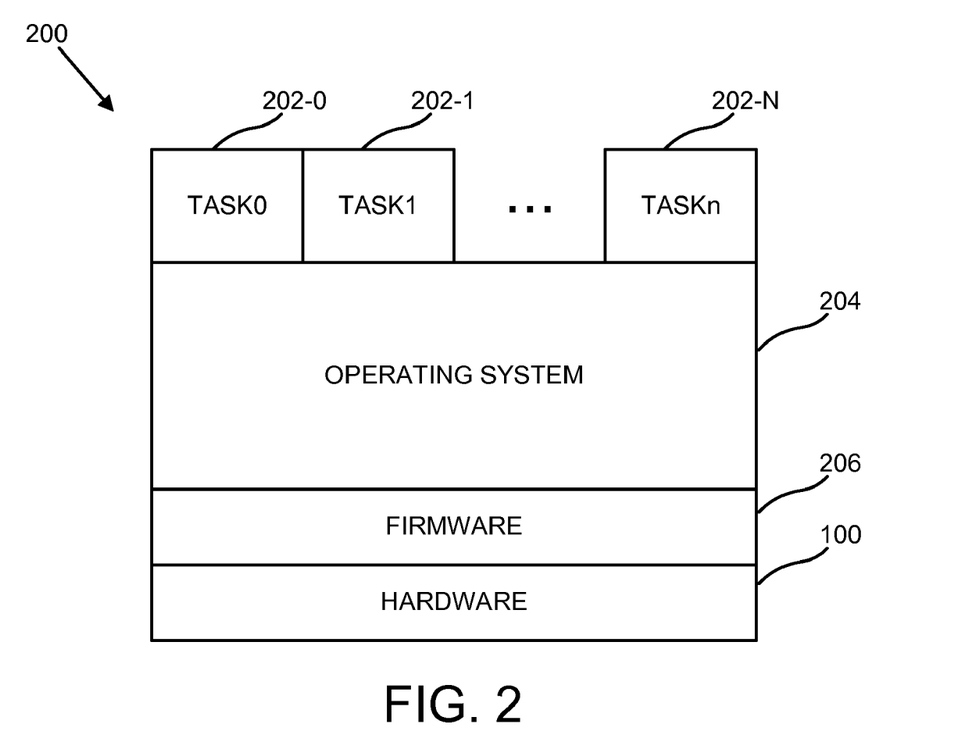
FIG. 2 is a schematic block diagram of a possible computer including a software stack in which the present invention may at least in part reside.

FIG. 2 is a diagram of a possible computer 200 including a software stack in which the present invention may at least in part reside. The software stack may include task(s) 202, hosted on an operating system 204, enabled by firmware 206, running on a hardware platform 100 of which the configuration of FIG. 1 is representative.

The task(s) 202 may include both user- and system-level tasks. They may be interactive or batch. They may run in the foreground or background. User-level task(s) 202 may include applications, programs, jobs, and middleware. System-level task(s) 202 may include services, drivers, daemons, and utilities.

The operating system 204 may be of any type and version and in any state. Types may include Unix, Linux, Windows, Mac, MVS, and VMS. Versions may include Windows XP and Windows Vista. States may include a degree of customization, a mode of operation, and a system preparation for setup. The operating system 204 may be single-user or multi-user. It may be single-tasking or multi-tasking. In an embodiment, the operating system 204 may be real-time. In another embodiment, the operating system 204 may be embedded.

The firmware 206 may comprise microcode, which may reside in a microstore of the processor(s) 102. In an embodiment, the firmware 206 may comprise low-level software, which may reside in memory 104. In one embodiment, the firmware 206 may comprise a rudimentary operating system 204. In a further embodiment, the firmware 206 may support virtualization so as to permit the concurrent operation of multiple operating systems 204 on a hardware platform 100.

Figure 3:
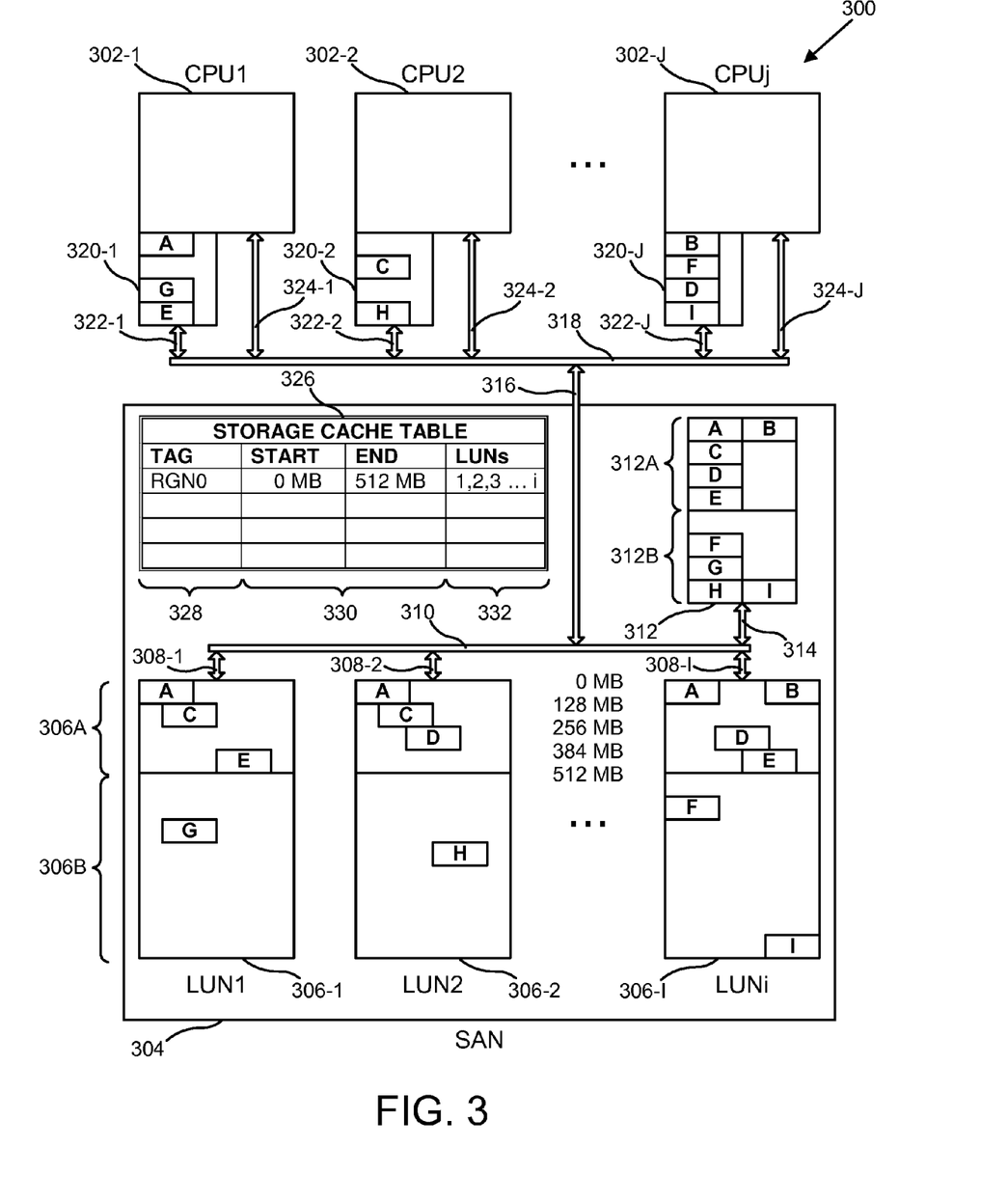
FIG. 3 is a schematic block diagram illustrating a data processing system comprised of multiple computers and a storage subsystem further comprised of storage partitions having a storage partition common area comprised of a single contiguous region, operating according to the present invention.

FIG. 3 is a schematic block diagram illustrating a data processing system 300 comprised of multiple computers 302 and a storage subsystem 304. The computers 302 may be of a type like computer 200. The storage subsystem 304 is further comprised of storage partitions 306 having a storage partition common area 306A comprised of a single contiguous region, operating according to the present invention. Data contained within the storage partition common area 306A is initially identical across all storage partitions 306-1 to 306-I. Conversely, data contained within the remaining storage, designated as the storage partition private area, are not necessarily identical across all storage partitions 306-1 to 306-I. Embodiments of the storage subsystem 304 may include a single storage device, a storage cabinet having a plurality of storage devices, and an entire SAN (Storage Area Network). In an embodiment, the storage partition 306 may be a LUN (Logical Unit Number). Each storage partition 306 has a storage partition data interface 308 to a storage partition data bus 310, over which data may be read from or written to a selected storage partition 306.

To reduce average access time to the storage subsystem 304, a storage cache 312 may be provided. The storage cache 312 may be subdivided into a storage cache common area 312A and a storage cache private area 312B, corresponding respectively to the storage partition common area 306A and the storage partition private area 306B. The storage cache 312 has a storage cache data interface 314 to the storage partition data bus 310, over which data may be read from or written to the storage cache 312.

The storage subsystem 304 may have a storage subsystem data interface 316 connecting the storage partition data bus 310 to a storage subsystem data bus 318. In an embodiment, the storage partition data bus 310 may physically coincide with the storage subsystem data bus 318, such that the storage subsystem data interface 316 becomes only conceptual in nature. Embodiments of the storage subsystem data bus 318 may include a SCSI (Small Computer System Interface) bus, a FC (Fiber Channel) fabric, and other SAN interconnect topologies.

The data processing system 300 may also include a distributed storage cache 320, having a distributed storage cache data interface 322 to the storage subsystem data bus 318. In such a configuration, each computer 302-1 through 302-J would be directly connected to a corresponding distributed storage cache 320-1 through 320-J, providing faster access to data cached therein than would be provided by the single storage cache 312, because data from the storage cache 312 would have to traverse the storage cache data interface 314, the storage partition data bus 310, the storage subsystem data interface 316, the storage subsystem data bus 318, and a computer storage data interface 324 in order to finally reach the computer 302. Nevertheless, the storage cache 310 has advantages over the distributed storage cache 320, including greater compactness, and a lower overall miss rate due to the fact that an item of data brought into the storage cache 320 to service a request by one computer 302 would then already be available to service subsequent potential requests for the same item of data by other computers 302.

The effective miss rate of the storage cache 312 may be even further reduced by deduplicating the data cached within the storage cache common area 312A as obtained from storage partition common area 306A which is identical across all storage partitions 306. An item of data brought into the storage cache common area 312A to service a request to one storage partition 306 within the storage partition common area 306A would then already be available to service subsequent potential requests for the identical item of data within other storage partitions 306.

Deduplication of the data cached within the distributed storage cache 320 may be performed in a similar manner. An item of data brought into the distributed storage cache 320 of one computer 302 to service a request by that computer 302 to one storage partition 306 within the storage partition common area 306A would then already be available to service subsequent potential requests for the identical item of data within other storage partitions 306. If the subsequent potential request were from another computer 302, it could still be serviced from the distributed storage cache 320 by traversing the distributed storage cache data interface 322, the storage subsystem data bus 318, and the computer storage data interface 324 in order to reach the other computer 302. Although that would constitute higher latency than the other distributed storage cache 320 which is connected directly to the other computer 302, it would still likely have lower latency than the storage cache 312.

Of course, the storage cache 312 and the distributed storage cache 320 do not represent mutually exclusive embodiments, as FIG. 3 clearly illustrates. The selection of either or both types of caching structures is a design trade-off that can be made based on a cost-benefit analysis relative to the requirements of the data processing system 300.

A storage cache partition table 326 is provided to track the deduplication of data within the storage cache 312 and the distributed storage cache 320. A tag 328 identifies the single contiguous storage region as RGN0. The location and size of RGN0 is indicated by a specified storage address range 330. In the example shown, RGN0 is 512 MB in size, starting at address 0 and ending at address 512 MB, constituting the entire storage partition common area 306A. Lastly, the storage partitions 306 having identical data within the common area 306A are indicated by the specified storage partitions 332.

To help illustrate the effect of reading from the storage subsystem 304 by the computers 302, data items A-I are shown, as they would appear if chronologically read in alphabetical order. Data item A is read by computer 302-1 from storage partition 306-1 in the storage partition common area 306A, and is cached in storage cache common area 312A and distributed storage cache 320-1. Data item A is subsequently read by computers 302-2 and 302-J from storage partitions 306-2 and 306-I. Having already been cached, these subsequent read requests can be serviced from storage cache common area 312A or distributed storage cache 320-1. In a similar manner, data item B is read by computer 302-J from storage partition 306-I and cached appropriately; data item C is read by computer 302-2 from storage partition 306-2, cached appropriately, and subsequently read from cache by computer 302-1; data item D is read by computer 302-J from storage partition 306-I, cached appropriately, and subsequently read from cache by computer 302-2; data item E is read by computer 302-1 from storage partition 306-1, cached appropriately, and subsequently read from cache by computer 302-J; and lastly data items F, G, H and I are read respectively by computers 302-J, 302-1, 302-2, and 302-J from storage partitions 306-I, 306-1, 306-2, and 306-I in storage partition private area 306B, and are cached in storage cache private area 312B and distributed storage cache 320.

It may be noted that distributed storage cache 320 is not subdivided into a common area and private area. In another embodiment, the division of storage cache 312 into the storage cache common area 312A and the storage cache private area 312B could be eliminated as well, since the specified storage address range 326 already indicates the location of the identical data comprising the common area. As long as the data being requested resides in the specified address range 326, and in one of the specified storage partitions 332, then if the data is cache-resident it may be used to service the request from cache.

In an embodiment, the storage cache common area 312A is partition-agnostic, such that the address range alone would be sufficient to determine cache residency. However, determination of cache residency in the storage cache private area 312B also requires the storage partition 306 to be known, since the data may very well differ from one storage partition 306 to another. The storage partition 306 must also be known in order to determine residency in the distributed storage cache 320, since there is no separate common area shown in the illustrated embodiment. If there were a separate common area in distributed storage cache 320, that area could also be partition-agnostic.

In another embodiment in which the number J of computers 302 were equal to the number I of storage partitions 306, and the storage partitions 306 were dedicated to computers 302 in a one-to-one correspondence, then the same one-to-one correspondence would exist between the distributed storage caches 320 and the storage partitions 306. In that case, the storage partition 306 would still have to be known in order to determine cache residency, but it would be implicit in the particular distributed cache 320 being accessed, and would not have to be explicitly associated with individual cached data items.

Figure 4:
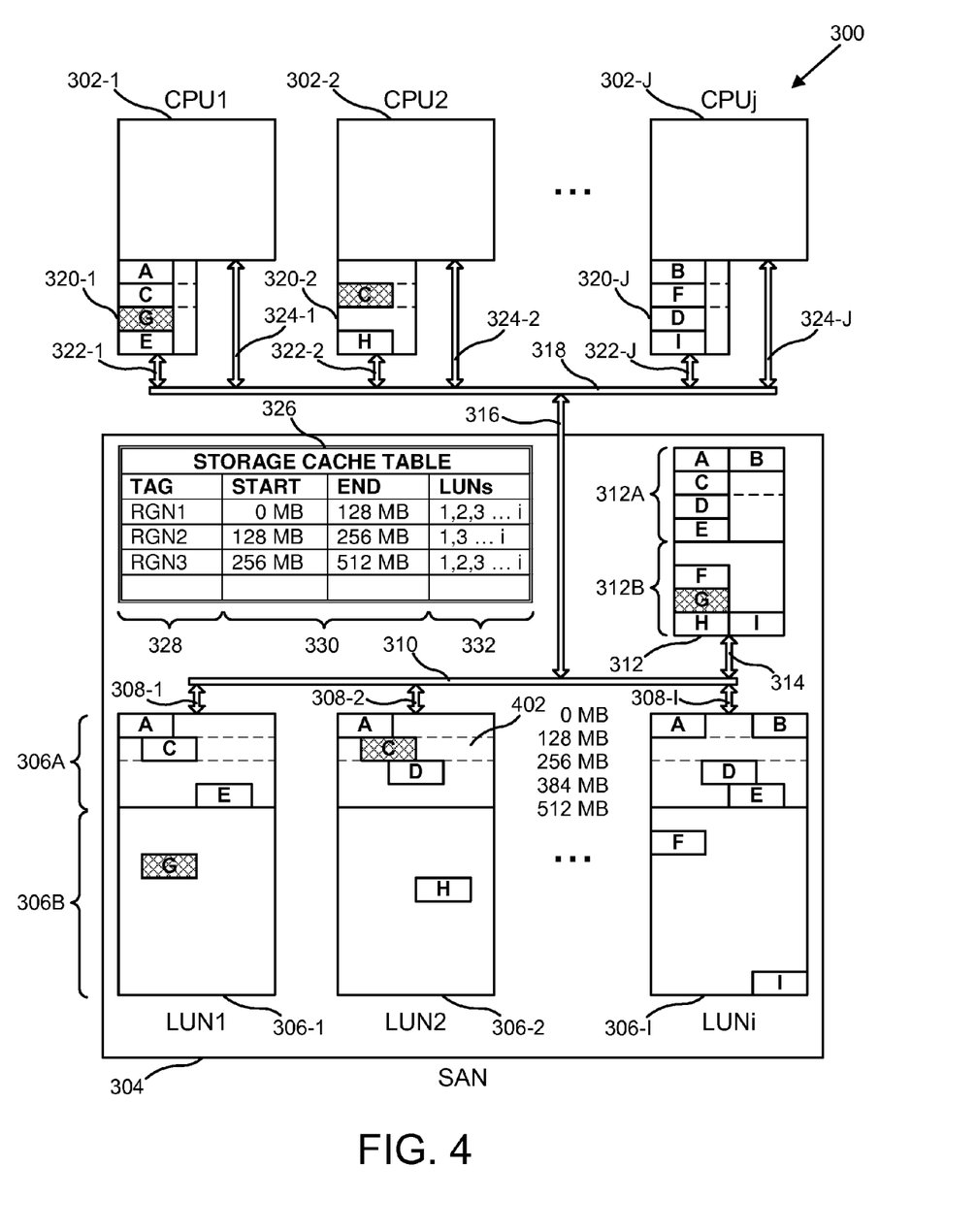
FIG. 4 is a schematic block diagram illustrating the effect of writing to the storage subsystem of the data processing system, both within the single contiguous region of the storage partition common area and within the storage partition private area.

FIG. 4 is a schematic block diagram illustrating the effect of writing to the storage subsystem 304 of the data processing system 300, both within the single contiguous region of the storage partition common area 306A and within the storage partition private area 306B. The initial scenario is assumed to be that of FIG. 3. Then data item G is written (illustrated with cross-hatching) by computer 302-1 to storage partition 306-1 in the storage partition private area 306B. The cached copies in distributed storage cache 320-1 and in storage cache private area 312B must also be updated, or else invalidated and subsequently re-cached.

A more complex situation unfolds when data item C is written (illustrated with cross-hatching) by computer 302-2 to storage partition 306-2 in the storage partition common area 306A. As before, the cached copy in distributed storage cache 320-2 must be updated, or else invalidated and subsequently re-cached. However, in this case the cached copy of data item C in the storage cache common area 312A cannot be updated, but must be invalidated since the data is no longer identical across all storage partitions 306, and must be re-deduplicated.

In the course of re-deduplication, RGN0 in the storage partition cache table 326 is subdivided into three regions. $RG_{N2}$ is created having a specified storage address range 330 of 128 MB to 256 MB, ideally the minimum-sized region to contain and isolate the modified data item C. Storage partition 306-2 is removed from among the specified storage partitions 332 for RGN2, since its data is no longer identical to that of the other storage partitions 306. RGN1 is created representing that part of RGN0 that precedes RGN2, and RGN3 is created representing that part of RGN0 that follows RGN2. The specified storage partitions 322 for RGN1 and RGN3 still include all of the storage partitions 306, including storage partition 306-2, since data item C is not within the specified storage address range 330 of those regions.

It may not be advisable to invoke re-deduplication after every write, due to the substantial overhead involved. In one embodiment, subdivision of a region into multiple smaller regions might only be performed when the number of specified storage partitions 322 for that region falls below a certain threshold.

The net result of re-deduplication is that section 402 (between the upper and lower dashed lines) of storage partition 306-2 has been effectively excised from the storage partition common area 306A. That not only excises modified data item C, but any other unmodified data in section 402 as well. Such collateral impact can be minimized by making the specified storage address range 330 for RGN2 as small as practically possible.

Unmodified data item C within other storage partitions 306 is still cacheable. After re-deduplication, unmodified data item C is read by computer 302-1 from storage partition 306-1 in the storage partition common area 306A, and is cached in storage cache common area 312A and distributed storage cache 320-1. Modified data item C is also cacheable in distributed storage cache 320-2, insofar as the distributed cache 320 is not subdivided into common and private areas, and modified data item C is implicitly or explicitly identified as belonging to storage partition 306-2, and thereby not among the specified storage partitions 332 of RGN2.

Figure 5:
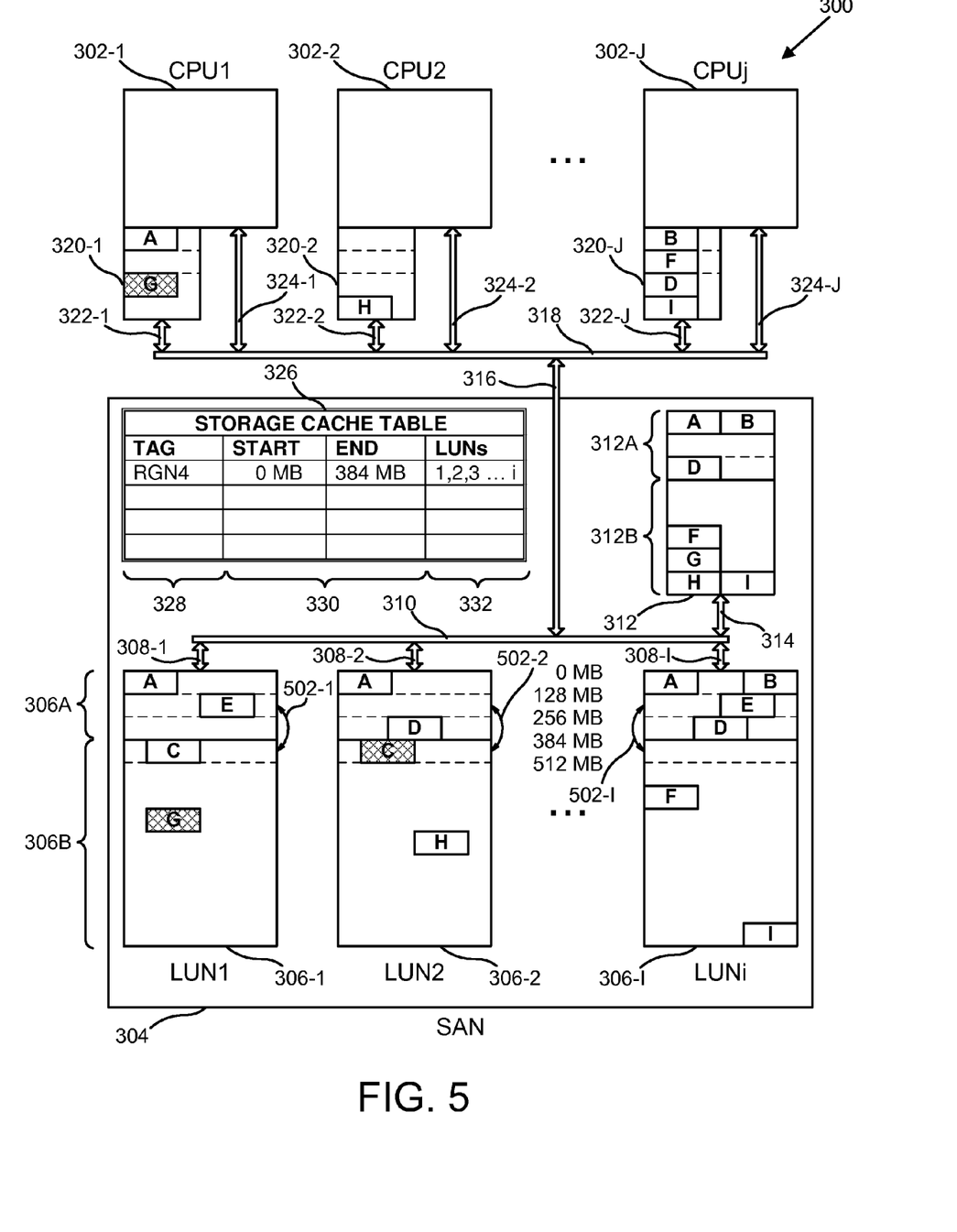
FIG. 5 is a schematic block diagram illustrating the effect of defragmenting the common area of the storage subsystem.

FIG. 5 is a schematic block diagram illustrating the effect of defragmenting the storage partition common area 306A of the storage subsystem 304. The initial scenario is assumed to be that of FIG. 4. The objective is to create a single contiguous region. This is accomplished by performing a swap 502 between the data in RGN2, having a specified storage address range 330 from 128 MB to 256 MB and the second half of the data in RGN3 having a storage address of 384 MB to 512 MB. Cached copies of the affected data are all invalidated. RGN1 and the swapped halves of RGN3, which are now contiguous and have the same specified storage partitions 332, may thus be merged to create RGN4. RGN2 has been eliminated altogether, becoming part of the storage partition private area 306B, and reducing the size of the storage partition common area 306A from 512 MB to 384 MB.

It may not necessarily be the case that defragmentation always causes the storage partition common area 306A to be reduced in size, if another storage address range of identical data across all storage partitions 306 happens to exist within the storage partition private area 306B and may thus be swapped into the storage partition common area 306A. Nevertheless, there is likely to be a trade-off between the size of the storage partition common area 306A and the threshold of fragmentation that is tolerated.

When that fragmentation threshold is exceeded, then defragmentation may be performed. For example, if a threshold were defined limiting the total number of regions to two, then the creation of RGN1-3 as illustrated in FIG. 4 would have invoked defragmentation, consolidating RGN1-3 into the single RGN4 as illustrated in FIG. 5, thus bringing the number of regions back below the threshold.

Figure 6:
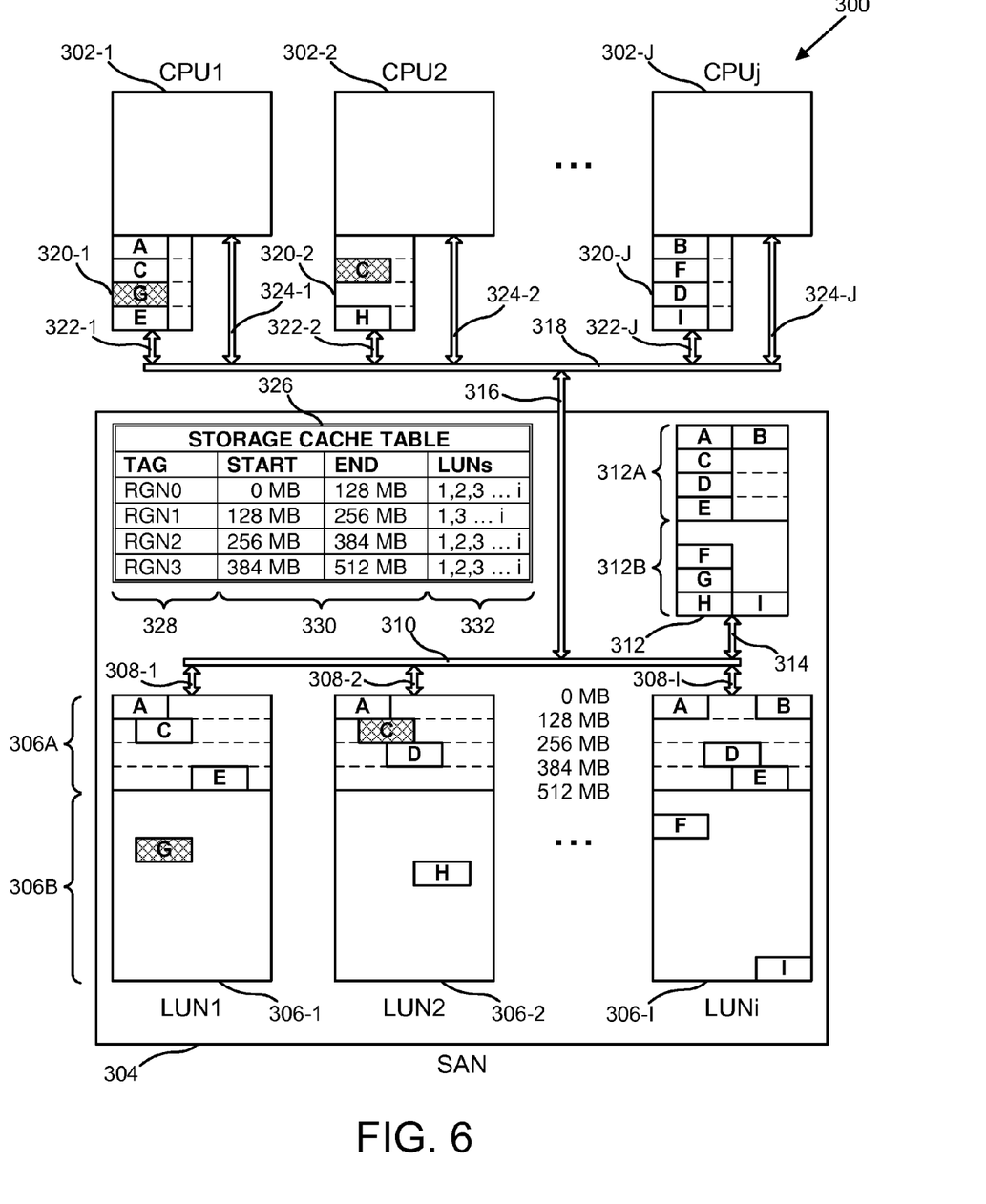
FIG. 6 is a schematic block diagram illustrating the effect of initializing the storage partition common area of the storage subsystem into multiple contiguous regions.

FIG. 6 is a schematic block diagram illustrating the effect of initializing the storage partition common area 306A of the storage subsystem 304 into multiple contiguous regions, RGN0-3, as opposed to a single all-inclusive RGN0. If the storage cache partition table 326 is sufficiently large, it may be more advantageous to have a greater number of entries.

One advantage of such an approach is that re-deduplication as illustrated in FIG. 4 becomes largely unnecessary. As before, data item C is written (illustrated with cross-hatching) by computer 302-2 to storage partition 306-2 in the storage partition common area 306A. The cached copy in distributed storage cache 320-2 must be updated, or else invalidated and subsequently re-cached. The cached copy of data item C in the storage cache common area 312A cannot be updated, but must be invalidated since the data is no longer identical across all storage partitions 306. For the same reason, storage partition 306-2 must be removed from among the specified storage partitions 332 for RGN1. Since RGN1 was already created as one of the original minimum-sized regions during initial de-duplication, no re-deduplication is required.

Another advantage of having a larger number of entries in the storage cache partition table 326 is that smaller regions can be more easily accommodated, thereby reducing the collateral impact of writes, as previously discussed. As was the case with the pros and cons of distributed caching, re-deduplication, and defragmentation, the size of the storage cache partition table 326 is another design parameter that may involve trade-offs.

Figure 7:
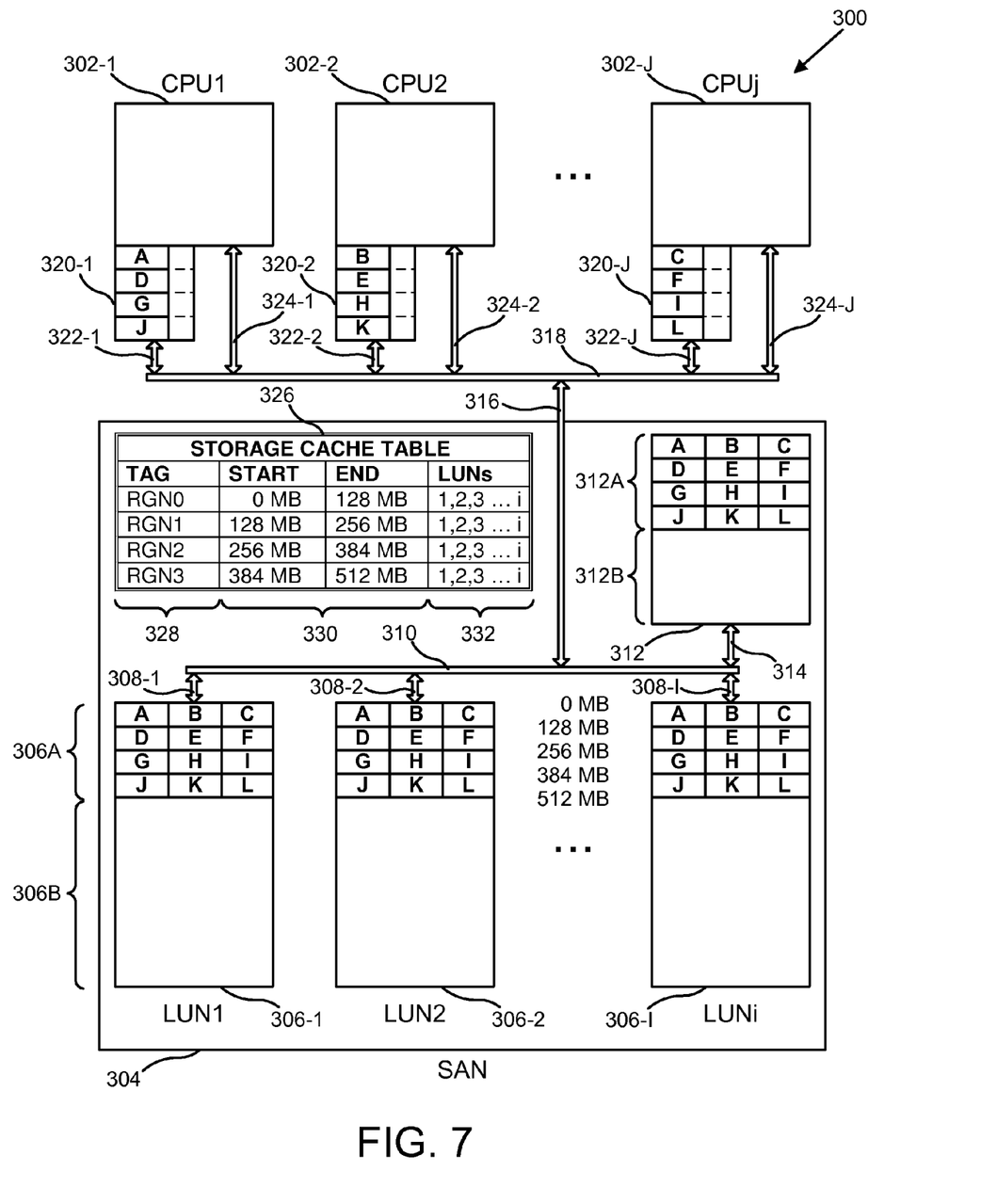
FIG. 7 is a schematic block diagram illustrating the effect of pre-caching a storage cache common area with the contents of the storage partition common area.

FIG. 7 is a schematic block diagram illustrating the effect of pre-caching a storage cache common area 312A with the contents of the storage partition common area 306A. The storage cache 312 has been enlarged to make this possible. Alternatively, the storage partition common area 306A could have been reduced in size. Another advantage of the distributed storage cache 320 that becomes apparent is that it was already cumulatively large enough to accommodate pre-loading and did not have to be further increased in size.

The benefit of pre-caching is that the miss rate for the storage partition common area 306A is effectively driven to zero, assuming that the pre-caching is performed far enough in advance of when the data is actually needed by the computers 302. Although typically only one initial miss would have otherwise occurred for each item of data, the resulting overhead could still have been quite significant to the extent that the storage partitions 306 exhibit very long latency. Pre-caching may entirely mask that latency and the attendant overhead. Eliminating that initial overhead may be particularly advantageous when simultaneously booting all of the computers 302 of the data processing system 300, as might occur when bringing up a large number of similarly-configured computers 302 such as blades, diskless workstations, call center workstations, thin clients, or POS terminals.

Figure 8:
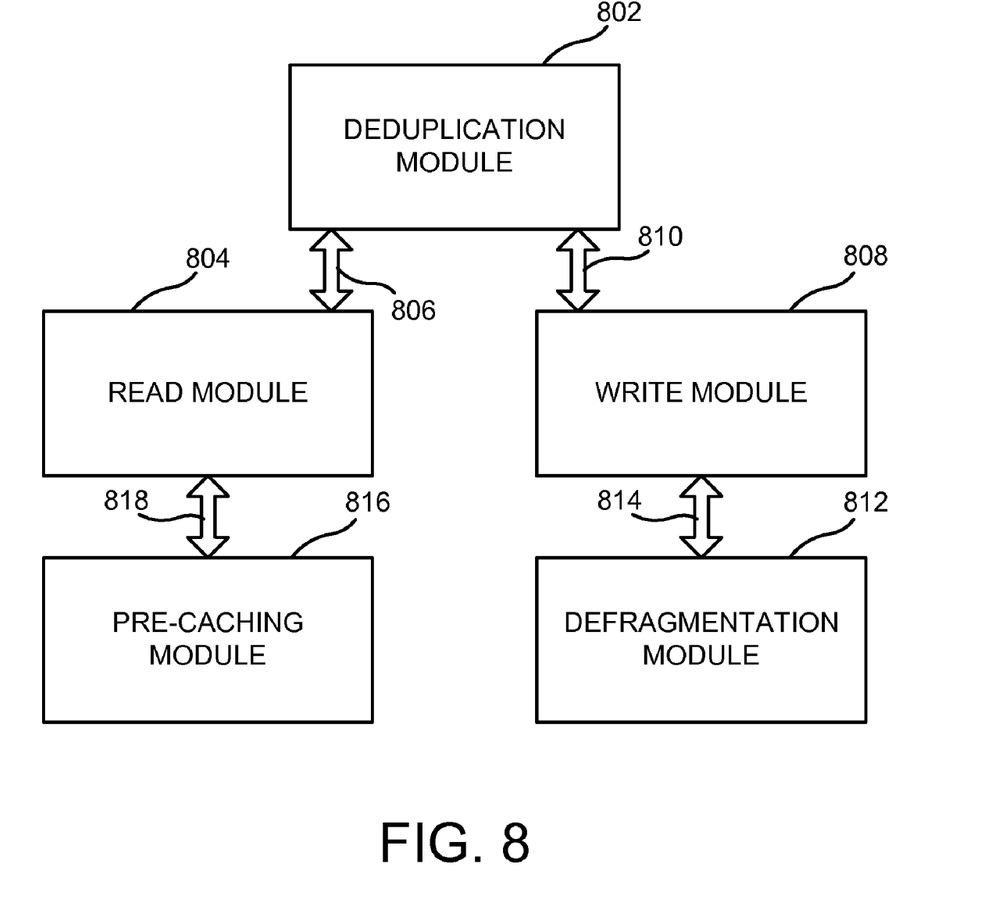
FIG. 8 is a schematic block diagram illustrating the inter-relationship of modules to control the operation of the present invention.

FIG. 8 is a schematic block diagram illustrating the inter-relationship of modules to control the operation of the present invention. The deduplication module 802 has the primary function of identifying the storage partition common area 306A and mapping it by building or re-building the storage cache partition table 326. It communicates with the read module 804 via the read module interface 806 to access the storage partitions 306. The read module 804 has the primary function of reading data from the storage subsystem 304 as efficiently as possible, by maintaining and accessing the storage cache 312 and the distributed storage cache 320, based at least in part upon the information in the storage cache partition table 326. The write module 808 has the primary function of writing data to the storage subsystem 304, updating and invalidating the storage cache 312 and the distributed storage cache 320 as appropriate, and removing specified storage partitions 332 from the storage cache partition table 326 when necessary. It communicates via the write module interface 810 with the deduplication module 802 to schedule re-deduplication as needed in order to maintain the storage cache partition table 326. The write module 808 may also invoke the defragmentation module 812 via the defragmentation module interface 814 if the number of new entries to be created in the storage cache partition table 326 in response to a write actually or potentially causes a specified threshold to be exceeded. The pre-caching module 816 communicates with the read module 804 via the pre-caching module interface 818 to read data from the storage partition common area 306A in order to initialize the contents of the storage cache common area 312A and the distributed storage cache 320. Additional interfaces not explicitly shown may exist between the modules as required in order to facilitate specific functions.

Figure 9:
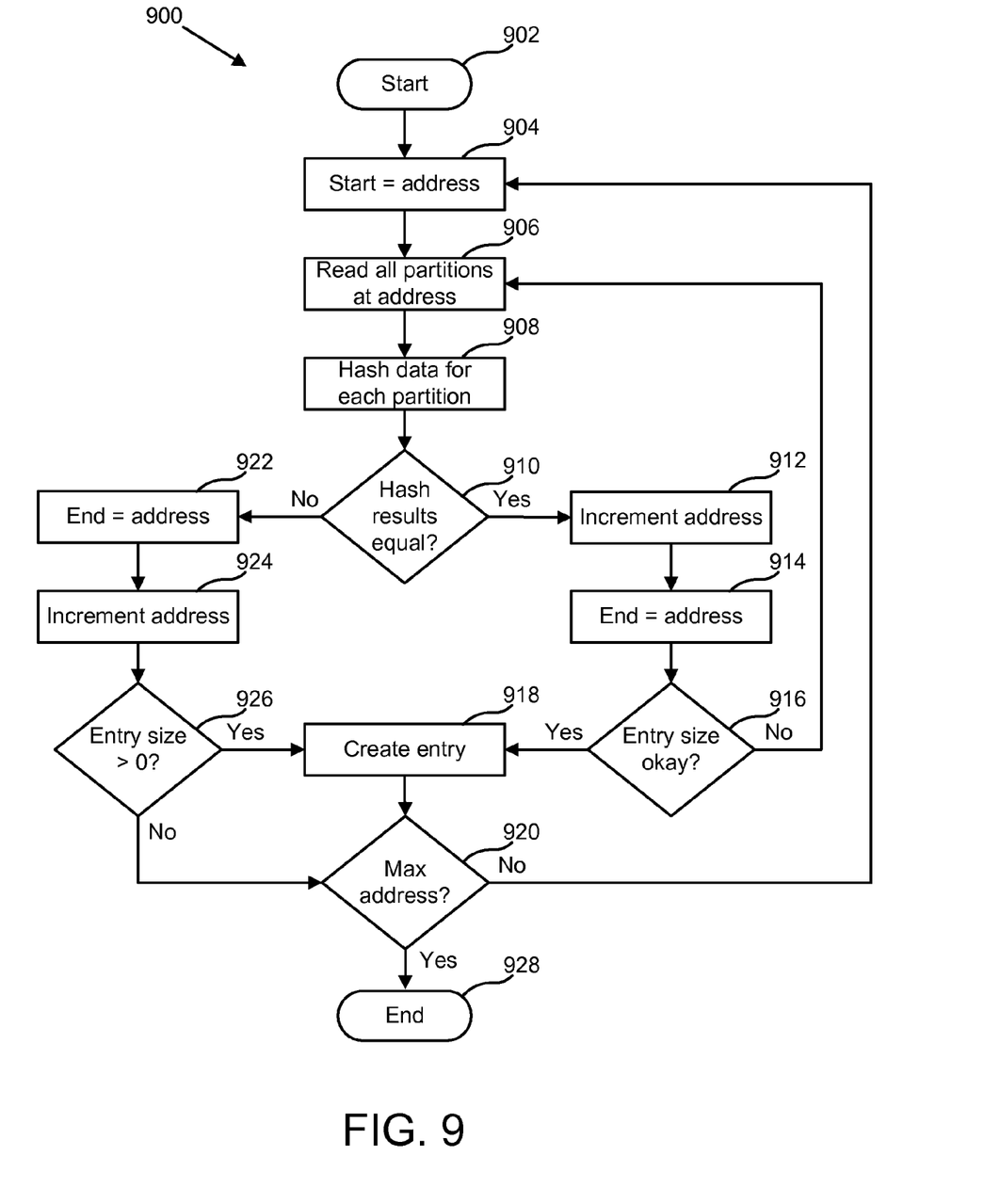
FIG. 9 is a schematic flow chart diagram illustrating one embodiment of a method for deduplicating a storage cache in accordance with the present invention.

FIG. 9 is a schematic flow chart diagram illustrating one embodiment of a method 900 for deduplicating a storage cache 312 in accordance with the present invention. The method 900 starts 902, given a beginning address and maximum address of the area to be deduplicated. The start address of a specified storage address range 330 is set equal 904 to the current (beginning) address. All storage partitions 306 are read 906 at the current address, and the read data is hashed 908. If the hash results are equal 910, indicating identical data at the current address across a given set of specified storage partitions 332, then the current address is incremented 912 and the end address of the specified storage address range 330 is set equal 914 to the current address. Note that the given set of specified storage partitions 332 may comprise some or all of the storage partitions 306. For initial deduplication, it may comprise all storage partitions 306, whereas for re-deduplication, a lesser number may suffice, such as those specified storage partitions 332 in a pre-existing entry. If the size of a prospective entry in the storage cache partition table 326 having the specified storage address range 330 is okay 916, meaning that it is of a given size, ranging from a minimum size up to the remainder of the area to be deduplicated, then the entry is created 918. If the size is not okay, the process of building the entry continues by reading 906 all storage partitions 306 at the recently incremented 912 current address and repeating the above steps. If the hash results are not equal 910, indicating non-identical data at the current address across a given set of specified storage partitions 332, then the end address of the specified storage address range 330 is set equal 922 to the current address, after which the current is incremented 924. If the prospective entry size is greater than zero 926, or in other words the end address is greater than the start address, then the entry is created 918. Whether or not an entry was created 918, if the current address has not reached the maximum 920 address, then the process of building another prospective entry is repeated, beginning with the step of setting the start address equal 904 to the current address. Once the current address reaches the maximum 920 address, then the method 900 ends 928.

Figure 10:
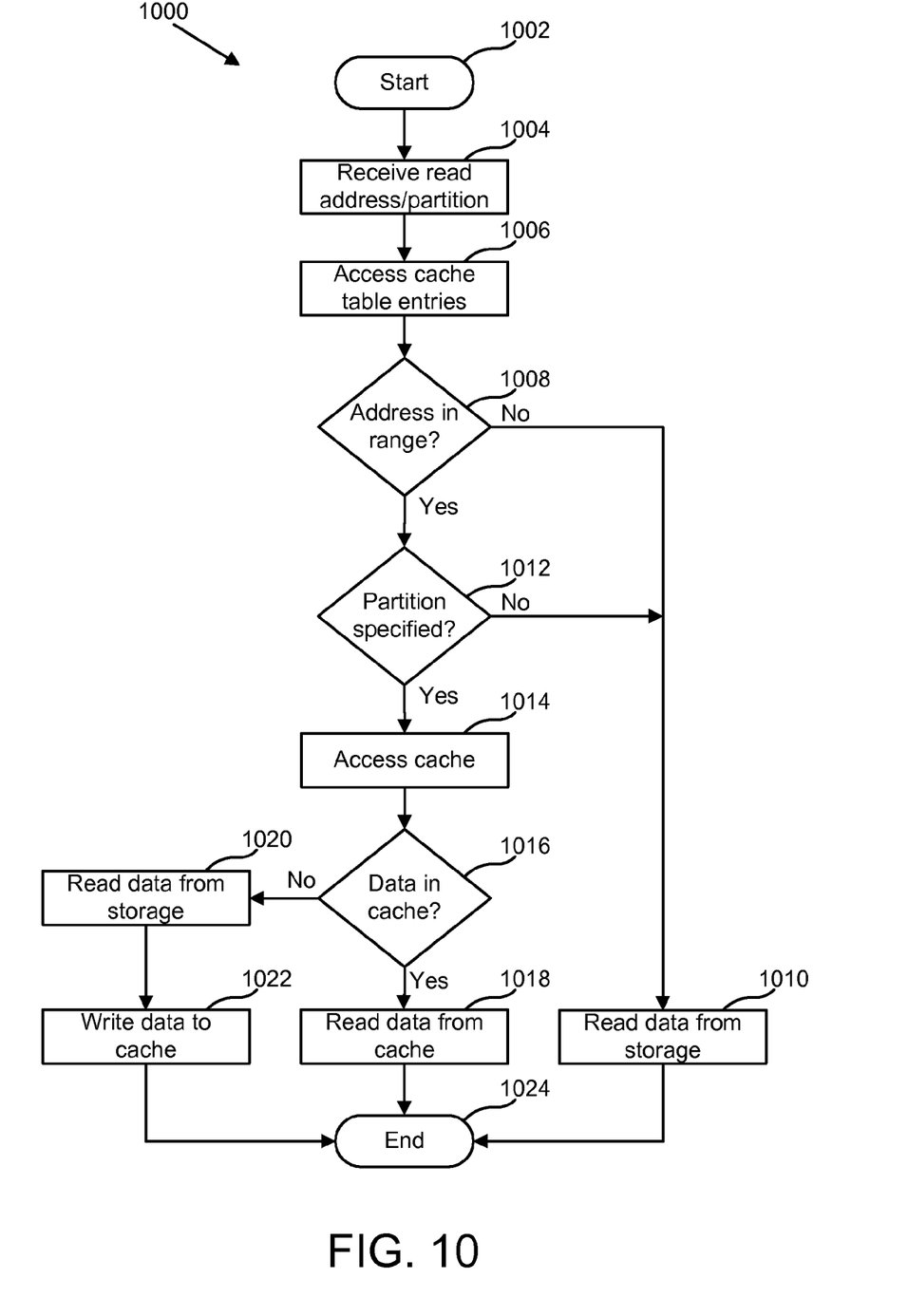
FIG. 10 is a schematic flow chart diagram illustrating one embodiment of a method for reading from the storage subsystem in accordance with the present invention.

FIG. 10 is a schematic flow chart diagram illustrating one embodiment of a method 1000 for reading from the storage subsystem 304 in accordance with the present invention. The method 1000 starts 1002 and a read address and read partition are received 1004. The entries in the storage cache partition table 326 are accessed 1006 to determine whether the read address falls within 1008 the specified storage address range 330 and whether the read partition is among 1010 the specified storage partitions 332. If not, then the data is read 1010 from the read storage partition 306 and the method 1000 ends 1024. If so, then the storage cache 312 is accessed 1014. If the data is in 1016 the storage cache 312, then the data is read 1018 from the storage cache 312 and the method 1000 ends 1024. If the data is not in 1016 the storage cache 312, then the data is read 1020 from the read storage partition 306, then written 1022 to the storage cache 312 for subsequent access, and the method 1000 ends 1024.

Figure 11:
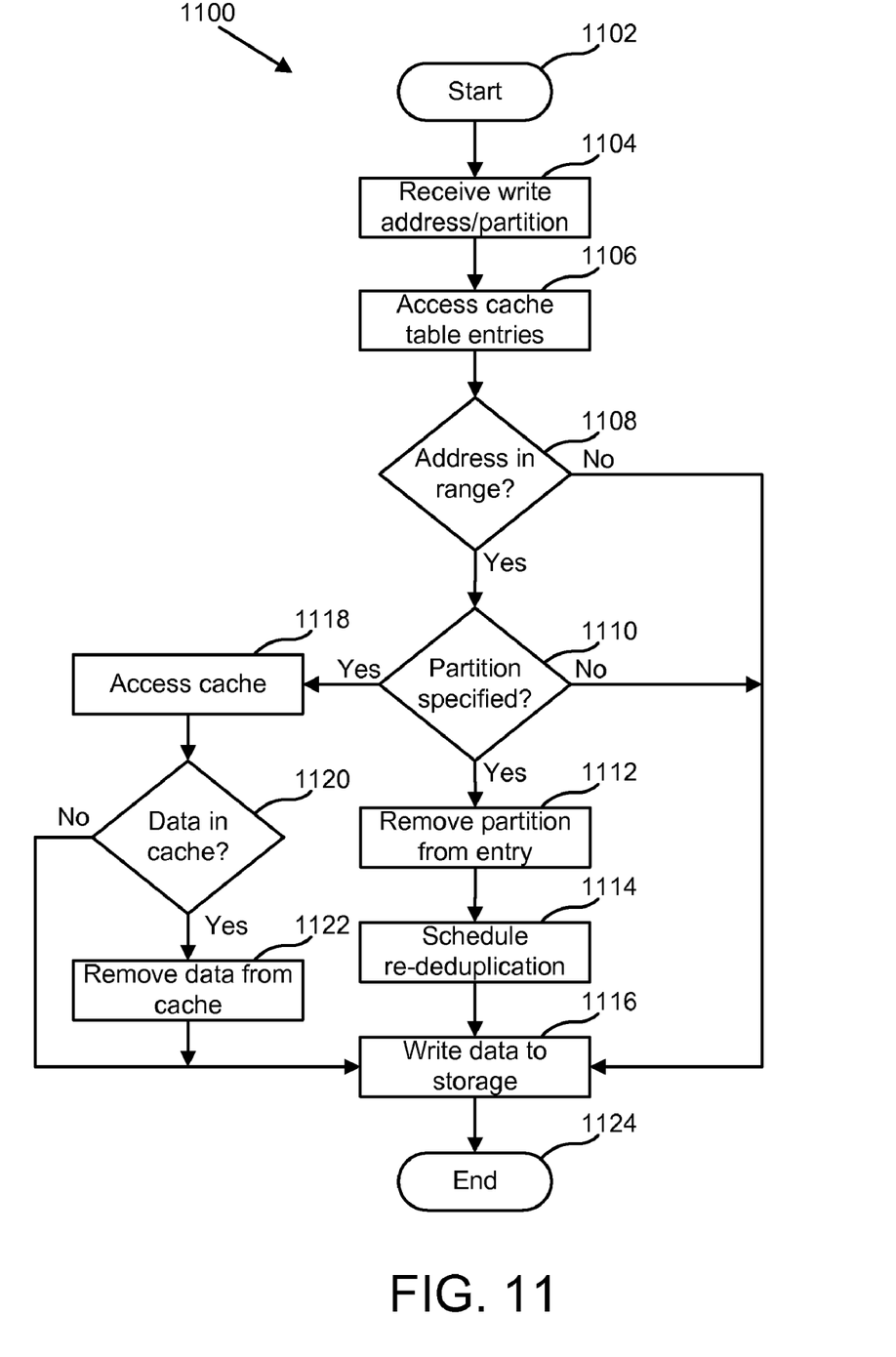
FIG. 11 is a schematic flow chart diagram illustrating one embodiment of a method for writing to the storage subsystem in accordance with the present invention.

FIG. 11 is a schematic flow chart diagram illustrating one embodiment of a method 1100 for writing to the storage subsystem 304 in accordance with the present invention. The method 1100 starts 1102 and a write address and write partition are received 1104. The entries in the storage cache partition table 326 are accessed 1106 to determine whether the write address falls within 1108 the specified storage address range 330 and whether the write partition is among 1110 the specified storage partitions 332. If not, then the data is written 1116 to the write storage partition 306 and the method 1100 ends 1124. If so, then the write partition is removed 1112 from among the specified storage partitions 332 in the storage cache partition table 326 entry. Re-deduplication is then scheduled 1114 for the specified storage address range 330 of that entry. Note that re-deduplication is actually unnecessary if the specified address range 330 is already of a minimum size, as it would have no effect in that case. Note also that re-deduplication is merely scheduled 1114, and not necessarily performed right away, but may instead be batched together with other pending re-deduplication requests. In parallel with the foregoing storage cache partition table 326 maintenance, the storage cache 312 is accessed 1118. If the data is in 1120 the storage cache 312, then the data is removed 1122 from the storage cache 312 because it is out of date. Lastly, the data is written 1116 to the write storage partition 306 and the method 1100 ends 1124.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a storage cache partition table having at least one entry associating a specified storage address range with one or more specified storage partitions;
a deduplication module configured to create an entry in the storage cache partition table wherein the specified storage partitions contain identical data to one another within the specified storage address range thus requiring only one copy of the identical data to be cached in a storage cache common area that is partition-agnostic; and
a read module configured to accept a read storage address within a read partition of a storage subsystem, to locate a read entry in the storage cache partition table wherein the specified storage address range contains the read storage address, and to determine whether the read partition is among the one or more specified storage partitions if the read entry is found, such that the read storage address alone is sufficient to determine residency of the identical data in the storage cache common area.

2. The apparatus of claim 1, wherein the specified storage address range is maximized so as to create as few entries as possible.

3. The apparatus of claim 1, further comprising a write module configured to accept a write storage address within a write partition of the storage subsystem, to locate a write entry in the storage cache partition table wherein the specified storage address range contains the write storage address, and to delete the write partition from among the one or more specified storage partitions if the write entry is found.

4. The apparatus of claim 3, wherein the specified storage address range is limited in size so as to lessen any potential impact of a write operation.

5. The apparatus of claim 1, wherein the storage partition is a LUN.

6. A system comprising:
a storage cache partition table having at least one entry associating a specified storage address range with one or more specified storage partitions;
a deduplication module configured to create an entry in the storage cache partition table wherein the specified storage partitions contain identical data to one another within the specified storage address range thus requiring only one copy of the identical data to be cached in a storage cache common area that is partition-agnostic;
a read module configured to accept a read storage address within a read partition of a storage subsystem, to locate a read entry in the storage cache partition table wherein the specified storage address range contains the read storage address, and to determine whether the read partition is among the one or more specified storage partitions if the read entry is found, such that the read storage address alone is sufficient to determine residency of the identical data in the storage cache common area;
a write module configured to accept a write storage address within a write partition of the storage subsystem, to locate a write entry in the storage cache partition table wherein the specified storage address range contains the write storage address, and to delete the write partition from among the one or more specified storage partitions if the write entry is found;
a storage subsystem comprising the storage partitions; and
one or more computers upon which to run the foregoing modules.

7. The system of claim 6, wherein the storage subsystem comprises a SAN.

8. The system of claim 7, wherein the SAN includes a storage cache.

9. The system of claim 6, wherein the one or more computers include a distributed storage cache.

10. The system of claim 9, where in the distributed storage cache is comprised of a dedicated storage cache per computer.

11. The system of claim 6, wherein the one or more computers are similarly configured.

12. The system of claim 11, wherein the one or more computers are selected from the set consisting of blades, diskless workstations, call center workstations, thin clients, and POS terminals.

13. The system of claim 11, wherein the storage subsystem comprises a dedicated storage partition per computer.

14. A computer program product comprising a computer readable storage medium having computer usable program code executable to perform operations for deduplicating storage cache data, the operations of the computer program product comprising:
creating an entry in a storage cache partition table associating a specified storage address range with one or more specified storage partitions wherein the specified storage partitions contain identical data to one another within the specified storage address range thus requiring only one copy of the identical data to be cached in a storage cache common area that is partition-agnostic;
accepting a read storage address within a read partition of a storage subsystem, to locate a read entry in the storage cache partition table wherein the specified storage address range contains the read storage address, and to determine whether the read partition is among the one or more specified storage partitions if the read entry is found, such that the read storage address alone is sufficient to determine residency of the identical data in the storage cache common area; and accepting a write storage address within a write partition of the storage subsystem, to locate a write entry in the storage cache partition table wherein the specified storage address range contains the write storage address, and to delete the write partition from among the one or more specified storage partitions if the write entry is found.

15. The computer program product of claim 14, wherein the operation of creating is potentially repeated after the operation of accepting the write storage address.

16. The computer program product of claim 14, wherein a hashing function is used to determine whether the specified storage partitions contain identical data to one another.

17. A method for deduplicating storage cache data, the method comprising the steps of:
  creating an entry in a storage cache partition table associating a specified storage address range with one or more specified storage partitions wherein the specified storage partitions contain identical data to one another within the specified storage address range thus requiring only one copy of the identical data to be cached in a storage cache common area that is partition-agnostic;
  accepting a read storage address within a read partition of a storage subsystem, to locate a read entry in the storage cache partition table wherein the specified storage address range contains the read storage address, and to determine whether the read partition is among the one or more specified storage partitions if the read entry is found, such that the read storage address alone is sufficient to determine residency of the identical data in the storage cache common area; and
  accepting a write storage address within a write partition of the storage subsystem, to locate a write entry in the storage cache partition table wherein the specified storage address range contains the write storage address, and to delete the write partition from among the one or more specified storage partitions if the write entry is found.

18. The method of claim 17, wherein the step of accepting the read storage address further comprises reading the storage cache data if the read entry is found and the identical data is cached, otherwise reading the read partition of the storage subsystem.

19. The method of claim 17, wherein the step of creating is potentially repeated after the step of accepting the write storage address.

20. The method of claim 19, wherein the write entry is replaced by creating an entry specifying a minimum-sized address range containing the write storage address and not specifying the write partition, and by creating one or more entries specifying the write partition and respectively specifying address ranges covering the specified storage address range of the write entry not covered by the minimum-sized address range.

21. The method of claim 17, further comprising a step of defragmenting the storage partitions by relocating data referenced by a minimum-sized address range containing the write storage address to a private area and then relocating the identical data that remains to occupy a common area which is as contiguous as possible.

22. The method of claim 21, wherein the step of defragmenting is invoked when a threshold of a maximum number of entries is exceeded.

23. The method of claim 17, further comprising a step of pre-caching the one copy of the identical data into a storage cache after the step of creating the entry.

24. The method of claim 17, further comprising a step of initiating a boot operation on one or more computers having access to the storage subsystem, wherein the boot operation is accelerated by deduplicating the storage cache data.

* * * * *